(12) United States Patent
Zhou

(10) Patent No.: US 10,856,164 B2
(45) Date of Patent: Dec. 1, 2020

(54) METHOD FOR SCHEDULING RESOURCES IN UNLICENSED FREQUENCY BAND, BASE STATION AND TERMINAL

(71) Applicant: BAICELLS TECHNOLOGIES CO. LTD., Beijing (CN)

(72) Inventor: Mingyu Zhou, Beijing (CN)

(73) Assignee: BAICELLS TECHNOLOGIES CO. LTD., Beijing (CN)

( * ) Notice: Subject to any disclaimer, the term of this patent is extended or adjusted under 35 U.S.C. 154(b) by 169 days.

(21) Appl. No.: 16/054,346

(22) Filed: Aug. 3, 2018

(65) Prior Publication Data

US 2018/0352464 A1   Dec. 6, 2018

Related U.S. Application Data

(63) Continuation of application No. PCT/CN2017/072556, filed on Jan. 25, 2017.

(30) Foreign Application Priority Data

Feb. 5, 2016   (CN) .......................... 2016 1 0082912

(51) Int. Cl.
   *H04W 24/10*   (2009.01)
   *H04L 5/00*   (2006.01)
   (Continued)

(52) U.S. Cl.
   CPC ............. *H04W 24/10* (2013.01); *H04L 5/006* (2013.01); *H04L 5/0044* (2013.01);
   (Continued)

(58) Field of Classification Search
   None
   See application file for complete search history.

(56) References Cited

U.S. PATENT DOCUMENTS

| 9,398,480 B2* | 7/2016 | Siomina | H04J 11/005 |
| 2009/0144425 A1* | 6/2009 | Marr | H04L 29/08072 |
| | | | 709/226 |

(Continued)

FOREIGN PATENT DOCUMENTS

| CN | 103944686 A | 7/2014 |
| CN | 105050189 A | 11/2015 |
| CN | 105722234 A | 6/2016 |

OTHER PUBLICATIONS

International Search Report for International Application No. PCT/CN2017/072556, dated May 3, 2017.

*Primary Examiner* — Ayaz R Sheikh
*Assistant Examiner* — Faiyazkhan Ghafoerkhan
(74) *Attorney, Agent, or Firm* — Marshall, Gerstein & Borun LLP

(57) ABSTRACT

The present disclosure discloses a method for scheduling resources in an unlicensed frequency band, a base station and a terminal. The method includes: receiving a data transmission request from a mobile communication network device; and when a transmission indicated by the data transmission request is a transmission that needs to be responded to, scheduling time-frequency resources for the mobile communication network device in accordance with a predetermined resource scheduling manner, so as to improve a transmission success rate at a specified resource location in the time-frequency resources. According to the present disclosure, the existing technical problem of lowering the channel access priority of the entire cell due to part of terminals which are affected by significant interference can be solved.

13 Claims, 4 Drawing Sheets

Receiving a data transmission request from a mobile communication network device — S202

When a transmission indicated by the data transmission request is a transmission that needs to be responded to, scheduling time-frequency resources for the mobile communication network device in accordance with to a predetermined resource scheduling manner, so as to improve a transmission success rate at a specified resource location in the time-frequency resources — S204

(51) Int. Cl.
*H04L 27/00* (2006.01)
*H04W 72/12* (2009.01)
*H04W 16/14* (2009.01)
*H04W 72/04* (2009.01)
*H04L 1/00* (2006.01)

(52) U.S. Cl.
CPC .......... *H04L 5/0055* (2013.01); *H04L 5/0057* (2013.01); *H04L 27/0006* (2013.01); *H04W 16/14* (2013.01); *H04W 72/042* (2013.01); *H04W 72/0446* (2013.01); *H04W 72/1231* (2013.01); *H04L 1/0026* (2013.01); *H04L 5/0007* (2013.01); *H04L 5/0051* (2013.01); *H04L 5/0073* (2013.01)

(56) References Cited

U.S. PATENT DOCUMENTS

| | | | | |
|---|---|---|---|---|
| 2010/0291921 | A1* | 11/2010 | Ruuska | H04W 24/00 455/426.1 |
| 2011/0028102 | A1* | 2/2011 | Li | H04W 74/0816 455/71 |
| 2012/0002704 | A1* | 1/2012 | Husted | H04L 1/0001 375/136 |
| 2012/0213077 | A1* | 8/2012 | Takeda | H04L 47/521 370/235 |
| 2013/0017794 | A1* | 1/2013 | Kloper | H04W 74/0808 455/63.1 |
| 2013/0267237 | A1* | 10/2013 | Kim | H04W 72/04 455/450 |
| 2015/0055588 | A1* | 2/2015 | Yerramalli | H04L 5/005 370/329 |
| 2015/0365152 | A1* | 12/2015 | Frenne | G03G 15/0812 370/252 |
| 2016/0066194 | A1* | 3/2016 | Kim | H04W 72/044 455/450 |
| 2016/0112169 | A1* | 4/2016 | Yerramalli | H04L 5/001 370/252 |
| 2016/0234751 | A1* | 8/2016 | Golaup | H04W 36/14 |
| 2016/0242213 | A1* | 8/2016 | Dabeer | H04W 74/0833 |
| 2016/0249384 | A1* | 8/2016 | Di Girolamo | H04W 72/0446 |
| 2016/0278103 | A1* | 9/2016 | Kazmi | H04L 5/0048 |
| 2017/0048838 | A1* | 2/2017 | Chrisikos | H04W 48/16 |
| 2017/0127357 | A1* | 5/2017 | Kobayashi | H04W 52/146 |
| 2017/0215200 | A1* | 7/2017 | Mallik | H04W 72/1268 |
| 2018/0167960 | A1* | 6/2018 | Zhang | H04W 72/0453 |
| 2018/0324506 | A1* | 11/2018 | Siwko | H04B 10/272 |
| 2019/0011852 | A1* | 1/2019 | Frenne | G03G 15/0812 |
| 2019/0044685 | A1* | 2/2019 | Nimbalker | H04L 1/0039 |

* cited by examiner

METHOD FOR SCHEDULING RESOURCES IN UNLICENSED FREQUENCY BAND, BASE STATION AND TERMINAL

CROSS-REFERENCE TO RELATED APPLICATIONS

The present application is based on International Application No. PCT/CN2017/072556 filed on Jan. 25, 2017, which claims priority to Chinese Patent Application No. 201610082912.7, filed on Feb. 5, 2016, the contents of which are incorporated herein by reference in its entirety.

TECHNICAL FIELD

The present disclosure relates to the field of communications, and in particular, to a method for scheduling resources in an unlicensed frequency band, a base station, and a terminal.

BACKGROUND

With the development of the existing technology, the mobile communication has been developed from the first generation to the fourth generation. The fourth generation of mobile communication has relatively internationally unified standards, is Long Term Evolution/Long Term Evolution-Advanced (LTE/LTE-A) established by 3GPP (the third Generation Partnership Project) of International Organization for Standardization, has a downlink based on Orthogonal Frequency Division Multiple Access (OFDMA) and an uplink based on Single Carrier-Frequency Division Multiple Access (SC-FDMA), and achieves high-speed transmission with a downlink peak value of 1 Gbps and an uplink peak value of 500 Mbps based on a flexible bandwidth and a self-adaptive modulation and coding mode.

At present, since the licensed spectrum owned by operators is limited, it is hoped to expand the capacity of LTE by utilizing unlicensed spectrum resources. Based on the foregoing requirement, 3GPP is establishing a standard for LTE to operate in the unlicensed frequency bands, i.e., Licensed-Assisted Access (LAA). The current unlicensed frequency bands near 5 GHz are mainly used by Wireless-Fidelity (Wi-Fi), and thus, in order to ensure to fairly compete channel resources with the current network Wi-Fi devices, 3GPP will consider, in the design of LAA, to use a channel competition mechanism similar to that in Wi-Fi to ensure fairness.

In the Wi-Fi (based on the 802.11 series of standards), a mechanism based on the Carrier Sense Multiple Access with Collision Avoidance (CSMA/CA) is adopted to ensure that multiple terminal devices effectively share channel resources, which is also referred to as distributed coordination function (DCF) in the 802.11 series of standards. According to the conclusion of the 3GPP RAN1#82bis conference, the random back off in the LAA adjusts the size of the contention window (CW, which is an integer) in a similar way to that used in the 802.11 series of standards, i.e., based on the correctness of the last transmission, that is, whether an ACK (abbreviation for Acknowledge, i.e., acknowledgement signal) is received. In the same Licensed-Assisted Access Date Line data burst (LAA DL data burst), there are multiple ACKs/NACKs (i.e., acknowledgement signals and negative acknowledgement signals) that UEs (User Equipment, i.e., mobile communication network terminals, which are represented by terminals in the description) feed back in multiple Hybrid Automatic Repeat request processes (HARM) in multiple sub-frames. For multiple UEs transmitted in the same downlink (i.e., from the base station to the UEs) data burst signal, since they are located in different geographic positions, each of the UEs is subjected to different interference, and the channel environments that they experience are different, this results in different proportions of the fed-back NACKs. As shown in FIG. 1, a base station eNB (abbreviation for evolved Node B) sends a data burst signal 1 to a terminal UE1 and a terminal UE2 (here, the data burst signal 1 is a useful signal), and a Wi-Fi device sends a Wi-Fi burst signal 2 to the terminal UE2 (here, the Wi-Fi burst signal 2 is an interference signal). Since the terminal UE2 is relatively close to the Wi-Fi device or other devices of the cell, the terminal UE2 is subjected to large interference, and since there are less other devices near the terminal UE1, the terminal UE1 is subjected to small interference. For the problem of the hidden nodes, although the interference signal power (such as RSSI, Received Signal Strength Indicator, received signal strength indication) may be reported by the UE to measure the interference environment in which the UE is located, the base station cannot usually ensure that the downlink signal received by the UE are not interfered by the signals sent from other devices (especially devices using other communication schemes, such as Wi-Fi devices). When the interference power is large, the probability that the UE incorrectly receives the downlink data is increased, and the proportion of the fed-back NACKs increases. When some UEs that are subject to large interference are scheduled to the reference sub-frame set, the proportion of the fed-back NACKs in the reference sub-frame set is increased, and the size of the contention window is increased (the channel access priority is reduced), thereby affecting the performances of other UEs that are subjected to small interference in the entire cell.

An effective solution has not been proposed for the existing technical problem of lowering the channel access priority of the entire cell due to part of terminals which are affected by significant interference.

SUMMARY

An embodiment of the present disclosure provides a method for scheduling resources in an unlicensed frequency band, and a base station and a terminal, so as to solve the existing technical problem of lowering the overall channel access priority of the entire cell due to part of terminals which are affected by significant interference.

According to an aspect of the embodiment of the present disclosure, a method for scheduling resources in an unlicensed frequency band is provided. The method includes: receiving a data transmission request from a mobile communication network device; and when a transmission indicated by the data transmission request is a transmission that needs to be responded to, scheduling time-frequency resources for the mobile communication network device in accordance with a predetermined resource scheduling manner, so as to improve a transmission success rate at a specified resource location in the time-frequency resources.

Further, the data transmission request carries an interference signal strength. Said scheduling the time-frequency resources for the mobile communication network device according to the predetermined resource scheduling manner includes: determining, in accordance with the interference signal strength, whether the mobile communication network device belongs to a first type of device or a second type of device, wherein an interference signal strength of the first type of device is greater than an interference signal strength of the second type of device; and scheduling different time-frequency resources for the first type of device and the second type of device.

Further, said scheduling different time-frequency resources for the first type of device and the second type of device includes: scheduling the time-frequency resources other than the specified resource location for the first type of device.

Further, the time-frequency resources other than the specified resource location includes one of: a first sub-frame to a second-to-last sub-frame of a data burst signal; a second sub-frame to a last sub-frame of the data burst signal; sub-frames of a first data burst signal to a second-to-last data burst signal in contiguous multiple data burst signals; or complete sub-frames or partial sub-frames after a first complete sub-frame of the data burst signal.

Further, said scheduling the time-frequency resources for the mobile communication network device in accordance with the predetermined resource scheduling manner includes: scheduling different time-frequency resources at the specified resource location for the mobile communication network device.

Further, said scheduling different time-frequency resources at the specified resource location for the mobile communication network device includes one of: in a case of a constant number of transmission bits, allocating more frequency resources than preset resources to the mobile communication network device; in a case of same time-frequency resources, allocating less transmission bits than preset transmission bits to the mobile communication network device; or allocating less transmission bits than the preset transmission bits to the mobile communication network device while allocating more frequency resources than the preset resources to the mobile communication network device.

Further, said scheduling the time-frequency resources for the mobile communication network device in accordance with the predetermined resource scheduling manner includes: scheduling time-frequency resources at the specified resource location for the mobile communication network device having a plurality of spatial channels.

Further, said scheduling different time-frequency resources at the specified resource location for the mobile communication network device includes: allocating frequency band resources having a first transmit power to the mobile communication network device when the mobile communication network device has a first channel quality; allocating frequency band resources having a second transmit power to the mobile communication network device when the mobile communication network device has a second channel quality. The first channel quality is lower than the second channel quality, and the first transmit power is greater than the second transmit power.

Further, said scheduling different time-frequency resources at the specified resource location for the mobile communication network device includes: scheduling the mobile communication network device to a first sub-bandwidth of the specified resource location when the mobile communication network device has a first interference signal strength, and scheduling the mobile communication network device to a second sub-bandwidth of the specified resource location when the mobile communication network device has a second interference signal strength. The first interference signal strength is greater than the second interference signal strength, and an interference signal strength of the first sub-bandwidth is lower than an interference signal strength of the second sub-bandwidth.

Further, said scheduling the time-frequency resources for the mobile communication network device in accordance with the predetermined resource scheduling manner includes: by means of increasing an aggregation level, scheduling time-frequency resources of a physical downlink control channel (PDCCH), and improving transmit power for transmitting a signal on the PDCCH.

Further, while scheduling different time-frequency resources for the first type of device and the second type of device, the method further includes: increasing time-frequency resources of a physical uplink control channel (PUCCH); and/or reducing code rates of an acknowledgment signal (ACK)/a negative acknowledgment signal (NACK) transmitted in a physical uplink shared channel (PUSCH).

Further, said scheduling the time-frequency resources for the mobile communication network device in accordance with the predetermined resource scheduling manner includes: determining an interference range of an interference signal affecting the mobile communication network device; scheduling time-frequency resources of a same data burst signal for mobile communication network devices within an interference range of a same interference signal.

According to another aspect of the embodiment of the present disclosure, there is further provided a base station. The base station includes: a receiving unit configured to receive a data transmission request from a mobile communication network device; and a scheduling processor configured to: when the transmission indicated by the data transmission request is a transmission that needs to be responded to, schedule time-frequency resources for the mobile communication network device in accordance with a predetermined resource scheduling manner, so as to improve a transmission success rate at a specified resource location in the time-frequency resources.

Further, the scheduling processor is configured to: determine, in accordance with an interference signal strength carried in the data transmission request, whether the mobile communication network device belongs to a first type of device or a second type of device, and schedule different time-frequency resources for the first type of device and the second type of device. An interference signal strength of the first type of device is greater than an interference signal strength of the second type of device.

According to another aspect of the embodiment of the present disclosure, there is further provided a non-transitory computer readable storage medium. The non-transitory computer readable storage medium stores computer instructions for causing a computer to perform the method for scheduling resources in an unlicensed frequency band as previously described in the present disclosure.

According to another aspect of the embodiment of the present disclosure, there is further provided a computer program product, including a computer program stored on a non-transitory computer readable storage medium. The computer program includes program instructions. When the program instructions are executed by a computer, the computer is caused to perform the method for scheduling resources in an unlicensed frequency band as previously described in the present disclosure.

According to another aspect of the embodiment of the present disclosure, there is further provided an electronic device including: at least one processor; and a memory communicatively connected to the at least one processor. The memory stores instructions executable by the at least one processor, and the instructions are configured to perform the method for scheduling resources in an unlicensed frequency band as previously described in the present disclosure.

According to another aspect of the embodiment of the present disclosure, there is further provided a method for scheduling resources in an unlicensed frequency band. The method includes: sending by a mobile communication network device a data transmission request to a base station to which the mobile communication network device is accessed; obtaining time-frequency resources scheduled by the accessed base station for the mobile communication network device in response to the data transmission request; and transmitting data to be transmitted in the scheduled time-frequency resources.

Further, the method further includes, prior to sending by the mobile communication network device the data transmission request to the base station to which the mobile communication network device is accessed: measuring a zero power channel state information-reference signal (ZP CSI-RS) according to a downlink signal from the accessed base station, and determining the interference signal strength of the mobile communication network device based on the ZP CSI-RS signal; and/or when a non-accessed base station occupies the channel, measuring the received signal power of the channel, and determining the interference signal strength of the mobile communication network device based on the received signal power; wherein the non-accessed base station is a base station that is not currently occupied by the mobile communication network device.

Further, the method further includes, prior to sending by the mobile communication network device the data transmission request to the base station to which the mobile communication network device is accessed: correcting the currently determined interference signal strength according to an indication from the accessed base station and/or the previously measured interference signal strength of the mobile communication network device.

According to another aspect of the embodiment of the present disclosure, there is further provided a terminal. The terminal includes: a sending unit configured to send by a mobile communication network device a data transmission request to a base station to which the mobile communication network device is accessed, and obtain time-frequency resources scheduled by the accessed base station for the mobile communication network device in response to the data transmission request; and a processor configured to control data to be transmitted to be transmitted in the scheduled time-frequency resources.

According to another aspect of the embodiment of the present disclosure, there is further provided a non-transitory computer readable storage medium. The non-transitory computer readable storage medium stores computer instructions for causing a computer to perform the method for scheduling resources in an unlicensed frequency band as previously described in the present disclosure.

According to another aspect of the embodiment of the present disclosure, there is further provided a computer program product, including a computer program stored on a non-transitory computer readable storage medium. The computer program includes program instructions. When the program instructions are executed by a computer, the computer is caused to perform the method for scheduling resources in an unlicensed frequency band as previously described in the present disclosure.

According to another aspect of the embodiment of the present disclosure, there is further provided an electronic device including: at least one processor; and a memory communicatively connected to the at least one processor. The memory stores instructions executable by the at least one processor, and the instructions are configured to perform the method for scheduling resources in an unlicensed frequency band as previously described in the present disclosure.

In the embodiment of the present disclosure, when receiving the data transmission request from the mobile communication network device that needs to be responded to, the base station schedules the time-frequency resources for the mobile communication network device according to the predetermined resource scheduling manner that can improve the transmission success rate at the specified resource location. That is, the proportion of the fed-back NACKs in the reference sub-frame set is reduced, and the transmission success rate of the channel priority reference sub-frame set (i.e., at the specified resource location described above) is improved. Since the channel access priority is adjusted proportionally based on the transmission success rate at the specified resource location, improving the transmission success rate at the specified resource location can increase the channel access priority. According to the foregoing embodiment of the present disclosure, the existing technical problem of lowering the overall channel access priority of the entire cell due to part of terminals which are affected by significant interference is solved.

BRIEF DESCRIPTION OF DRAWINGS

The accompanying drawings described herein are provided for a further understanding of the present disclosure, and constitute part of the present disclosure. The illustrative embodiments of the present disclosure and the description thereof are for explaining the present disclosure and do not constitute an undue limitation to the present disclosure. In the accompanying drawings.

DESCRIPTION OF EMBODIMENTS

In order to make those skilled in the art better understand the solution of the present disclosure, the technical solutions in the embodiments of the present disclosure are clearly and completely described in the following with reference to the accompanying drawings in the embodiments of the present disclosure. It is apparent that the described embodiments are only part of the embodiments of the present disclosure, but not all of them. All other embodiments obtained by those of ordinary skill in the art based on the embodiments of the present disclosure without any creative effort shall fall within the scope of protection of the present disclosure.

It should be noted that the terms "first", "second" and the like in the description and claims, as well as the above-mentioned drawings, of the present disclosure are used to distinguish similar objects, but not necessarily used to describe a specific order or precedence order. It should be understood that data used in this way may be interchanged where appropriate so that the embodiments of the present disclosure described herein can be implemented in a sequence other than those illustrated or described herein. The terms "including" and "having" and any variants thereof are intended to cover non-exclusive inclusions. For example, a process, method, system, product, or device that includes a series of steps or units is not necessarily limited to those steps or units that are clearly listed, but may include other steps or units that are not clearly listed or are inherent to such processes, methods, products, or devices.

In accordance with an embodiment of the present disclosure, a method for scheduling resources in an unlicensed frequency band is provided, it should be noted that the steps illustrated in the flowcharts of the figures may be performed, for example, in a computer system having a set of computer-executable instructions, and although the logical orders are shown in the flowcharts, in some cases, the steps shown or described may be performed in different orders than the ones described herein.

Figure 1:
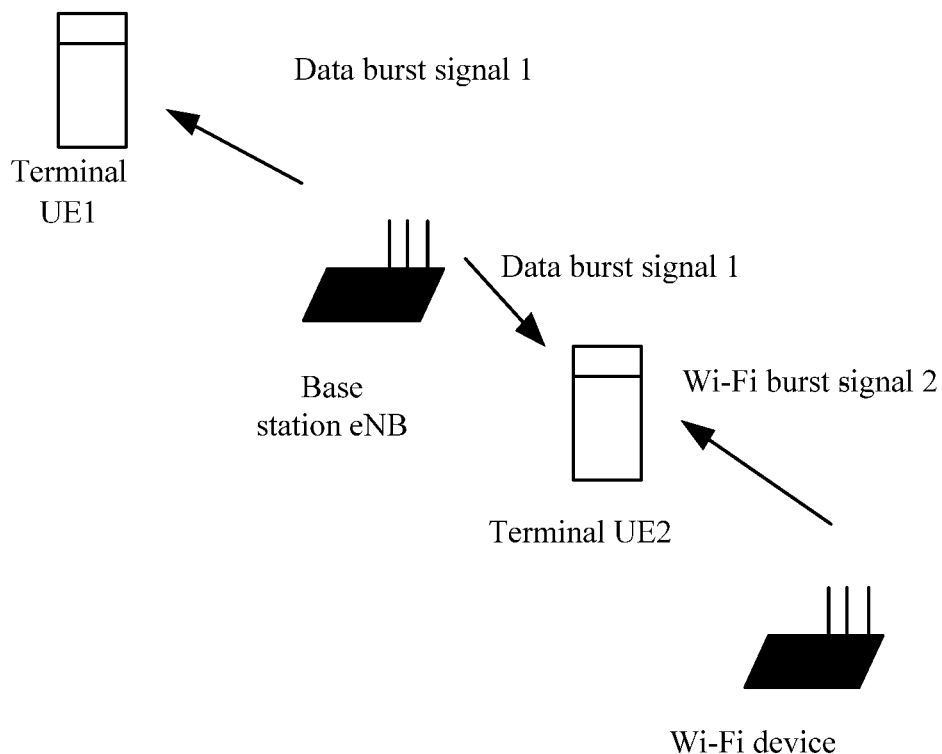
FIG. 1 is a schematic diagram of data transmission of a base station according to the prior art.
Figure 2:
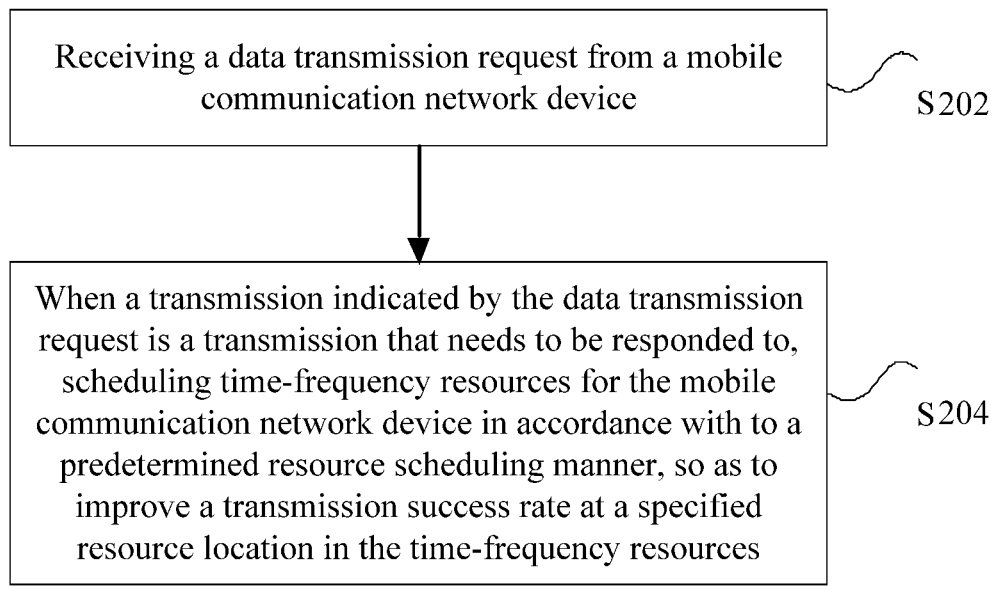
FIG. 2 is a flowchart of a method for scheduling resources in an unlicensed frequency band according to an embodiment of the present disclosure.

FIG. 2 is a flowchart of a method for scheduling resources in an unlicensed frequency band according to an embodiment of the present disclosure. As shown in FIG. 2, the method includes step S202 and step S204.

At step S202, a data transmission request is received from a mobile communication network device.

At step S204, when the transmission indicated by the data transmission request is a transmission that needs to be responded to, time-frequency resources are scheduled for the mobile communication network device according to a predetermined resource scheduling manner, so as to improve the transmission success rate at a specified resource location in the time-frequency resources.

In the embodiment of the present disclosure, when receiving the data transmission request from the mobile communication network device that needs to be responded to, the base station schedules the time-frequency resources for the mobile communication network device according to the predetermined resource scheduling manner that can improve the transmission success rate at the specified resource location. That is, the proportion of the fed-back NACKs in the reference sub-frame set is reduced, and the transmission success rate of the channel priority reference sub-frame set (i.e., at the specified resource location described above) is improved. Since the channel access priority is adjusted proportionally based on the transmission success rate at the specified resource location, improving the transmission success rate at the specified resource location can increase the channel access priority. According to the foregoing embodiment of the present disclosure, the existing technical problem of lowering the overall channel access priority of the entire cell due to part of terminals which are affected by significant interference is solved.

The channel access priority refers to the priority of the mobile communication network device to transmit data in the channel of the obtained time-frequency resources when the time-frequency resources are limited.

The above mobile communication network device may be a mobile communication network terminal, and the terminal refers to a terminal product that can support the communication protocol of land mobile communication system, such as a mobile phone, a tablet computer; or may be a modem module for a special communication (Wireless Modem), the modem module may be integrated in various types of terminals such as a mobile phone, a tablet computer, and a data card to complete the communication function.

Figure 3:
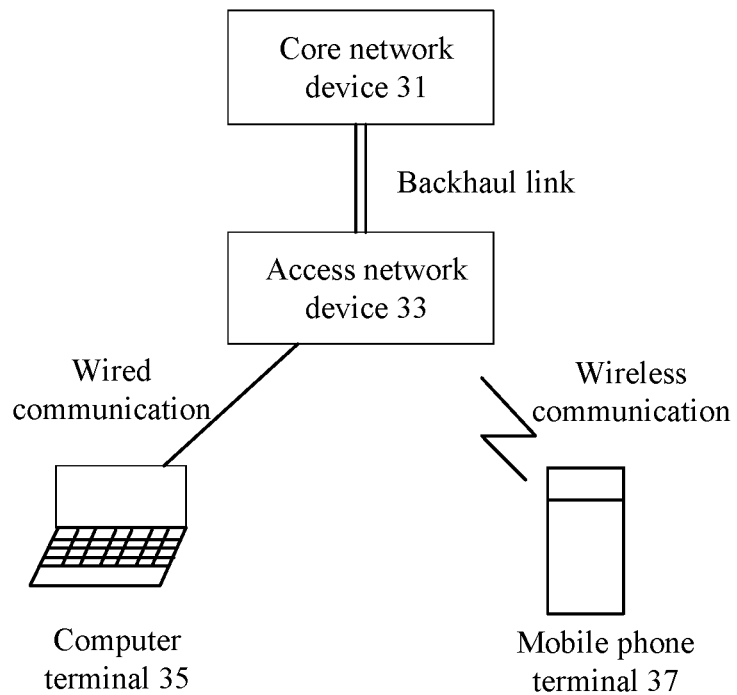
FIG. 3 is a schematic diagram of an alternative application environment of a method for scheduling resources in an unlicensed frequency band according to an embodiment of the present disclosure.

The mobile communication system refers to a system which provides communication services for a user terminal (such as a mobile phone) by deploying, by operators, a wireless access network device (such as a base station) and a core network device (such as a Home Location Register, HLR), etc. As shown in FIG. 3, a basic architecture of a mobile communication network is schematically illustrated. The basic architecture includes a core network device 31 (such as a HLR), an access network device 33 (such as a base station), a computer terminal 35, and a mobile phone terminal 37. The core network device 31 is connected to the access network device 33 through a backhaul link, the access network device 33 is connected to the computer terminal 35 through wired communication, and the access network device 33 is connected to the mobile phone terminal 37 through wireless communication.

Since the licensed spectrum owned by operators is limited, it is hoped to expand the capacity of LTE by utilizing unlicensed spectrum resources. Based on the foregoing requirement, 3GPP is establishing a standard for LTE to operate in the unlicensed frequency bands, i.e., Licensed-Assisted Access (LAA). The current unlicensed frequency bands near 5 GHz are mainly used by Wireless-Fidelity (Wi-Fi), and thus, in order to ensure to fairly compete channel resources with the current network Wi-Fi devices, 3GPP will consider, in the design of LAA, to use a channel competition mechanism similar to that in Wi-Fi to ensure fairness.

The LTE unlicensed frequency band access technology is intended to extend the LTE system to resource-rich unlicensed frequency band by means of licensed frequency band-assisted access, so as to meet the growing demand for data services at a lower cost, and to ensure the value of licensed spectrum of the foundation operators, to make the LTE system in harmony with the existing Wi-Fi networks.

At present, in the Wi-Fi, a mechanism based on CSMA/CA, i.e., DCF mechanism in the 802.11 series of standards, is adopted to ensure that multiple terminal devices effectively share channel resources. Specifically, the basic flow of the DCF mechanism is: prior to transmitting the data, the terminal first generates a random back off time in units of slot time (such as 9 μs), and then starts to detect the channel busy/idle state; when it is detected that the channel idle duration is DCF Inter-Frame Space (DIFS, such as 34 μs), the random back off time is decremented by 1 each time an idle having a slot time length is detected, and when the random back off time is 0, the transmission starts. If it is detected at midway that the channel is busy, the random back off time is kept at the current remaining value, that is, the process of back off is deferred. After the channel is idle again for DIFS, the decrement continues.

Figure 4:
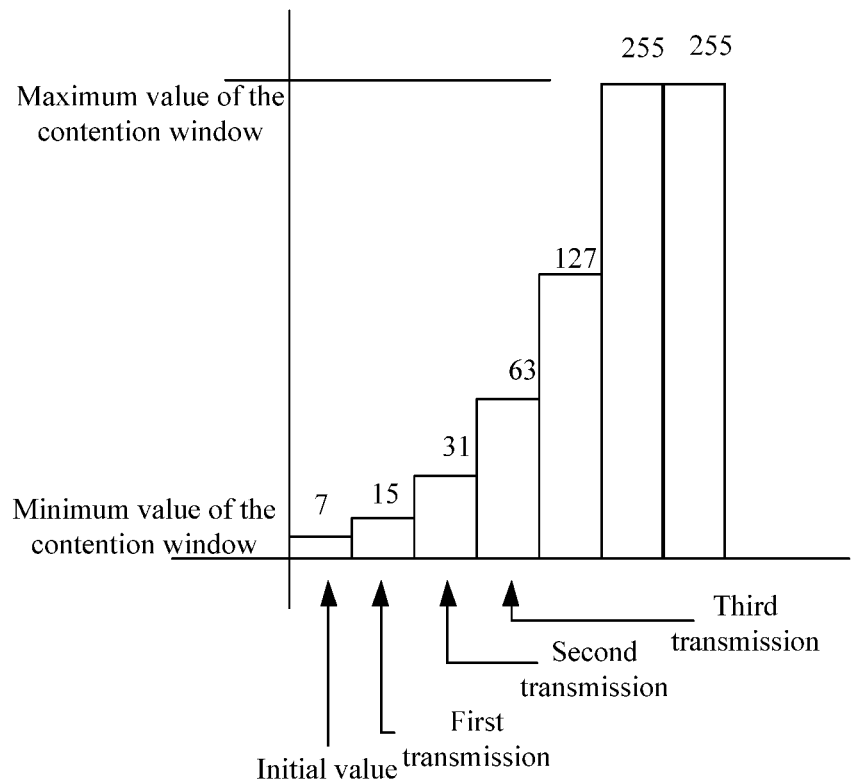
FIG. 4 is a schematic diagram of adjustment of an alternative contention window according to an embodiment of the present disclosure.

The random back off time is randomly selected from the range of 0 to the contention window (CW, which is an integer), and the CW will be adjusted based on the correctness of the last transmission, that is, whether an ACK (Abbreviation for Acknowledge, i.e., acknowledgement signal) is received. The adjustment rule is: when the ACK fed back by the receiving end for the previous transmission is not received, the CW is increased to the next preset value until the maximum value; and when the ACK fed back by the receiving end for the previous transmission is received, the CW is reset to the initial value. As shown in FIG. 4, the maximum value of the contention window is 255, the initial value of the contention window is 7, the ACK feedback is not received in the first transmission, and thus the contention window is increased to 15, and so on, and as shown in FIG. 4, until the competition window is increased to the maximum value 255 of the competition window.

According to the conclusion of the 3GPP RAN1#82bis conference, the random back off in the LAA adjusts the size of the CW in a similar way to that used in the 802.11 series of standards, i.e., based on the correctness of the last transmission. Since in the same LAA DL data burst, there are multiple ACKs/NACKs that UEs feed back in multiple HARQ processes in multiple sub-frames, it is necessary to making statistics of multiple ACK/NACK feedback results, and there are also various assumptions regarding the number and positions of the statistic sub-frames. At present, the 3GPP RAN1#82bis conference has the following conclusions on the proportions of ACKs/NACKs and the reference sub-frame sets for making statistics of ACKs/NACKs:

1) when the proportion of the NACKs in the reference sub-frame set is greater than Z %, it is determined that the size of the contention window of the next transmission should be increased to the next preset value; and when the proportion of the NACKs in the reference sub-frame set is lower than Z %, it is determined that the size of the contention window of the next transmission should be reset to the initial value;

2) the value of Z is {10%, 50%, 75%, 100%};

3) corresponding to the Listen Before Talk (LBT), the value of the contention window is {15, 31, 63} when the priority is 3; and 4) the reference sub-frame set includes one of the following: a) the latest downlink sub-frame that can feed back ACK/NACK, that is, the last (i.e., the closest to the current adjusted contention window parameter) sub-frame that feeds back ACK/NACK in the previous downlink data burst signal; b) a first sub-frame in the latest downlink data burst signal that can feed back ACK/NACK, that is, the first sub-frame in the previous downlink data burst signal that can feed back ACK/NACK; c) all of the sub-frames in the latest downlink data burst signal that can feed back ACK/NACK, that is, all of the sub-frames in the previous downlink data burst signal that can feed back ACK/NACK; d) a first complete sub-frame and a partial sub-frame that may exist before the first complete sub-frame in the latest downlink data burst signal (the length of the partial sub-frame is less than that of the complete sub-frame), that is, when the first sub-frame is a complete sub-frame, the first sub-frame in the reference sub-frame set is the first complete sub-frame, and when the first sub-frame is a partial sub-frame, the first sub-frame in the reference sub-frame set is the first sub-frame (partial sub-frame) and the complete sub-frame before the first sub-frame.

The above data transmission process includes: a sending end (such as a mobile communication network device) temporarily stops every time it sends one data packet, to wait for the acknowledgment information from a receiving end (such as a base station). When the data packet is sent to the receiving end, the receiving end performs error detection for the data packet. If the received data packet is correct, an acknowledgment signal ACK is returned; if the received data packet is incorrect, a negative acknowledgment signal NACK is returned. When the sending end receives the ACK signal, it sends new data, and otherwise it re-sends the data packet transmitted last time. During the process of waiting for the acknowledgment information, the channel is idle and sends no any data. With respect to this method, since the sending and receiving parties only operate on the same data packet during the same time period, the implementation is relatively simple, the corresponding signaling overhead is small, and the requirement for the buffer capacity of the receiving end is low.

Specifically, when the base station receives the data transmission request from the mobile communication network device that needs to be responded to, on the one hand, the base station can schedule different time-frequency resources for different terminals according to the interference strengths reported by the terminals, for example, can schedule the time-frequency resources other than the reference sub-frame set for the terminals having large measured interference strengths; can report conservative channel state information for the terminals having large measured interference strengths, so as to improve the reliability of data transmission; and can schedule the terminals having similar measured interference strengths into the same data burst signal, so as to ensure the consistency of interference situations to ensure the reliability of the channel access priority; on the other hand, the transmission redundancy on the reference sub-frame set may be improved to improve the transmission reliability of the channel priority reference sub-frame set, for example, the base station adopts a conservative transmission mode for data transmission in the reference sub-frame set.

In the foregoing embodiment, the mobile communication network device improves the transmission success rate at the specified resource location (such as the location of the reference sub-frame set) by means of wireless resource management. The channel access priority is adjusted proportionally based on the transmission success rate at the specified resource location. That is, the channel access priority is increased by improving the transmission success rate of the reference sub-frame set. The higher the transmission success rate is, the smaller the contention window is, and the higher the channel access priority is.

According to the foregoing embodiment, while the existing problem of lowering the overall channel access priority of the entire cell due to part of terminals which are affected by significant interference is solved, the terminals should follow the principle to fairly compete the channels.

In the foregoing embodiment of the present disclosure, the data transmission request carries the interference signal strength, wherein scheduling the time-frequency resources for the mobile communication network device according to the predetermined resource scheduling manner includes: determining whether the mobile communication network device belongs to a first type of device or a second type of device according to the interference signal strength, wherein the interference signal strength of the first type of device is greater than the interference signal strength of the second type of device; and scheduling different time-frequency resources for the first type of device and the second type of device.

Specifically, an interference signal power (such as RSSI, that is, the received signal strength indication) may be reported by the UE (i.e., the mobile communication network device). When receiving the interference signal power reported by the UE, the base station may determine the interference environment in which the UE is located according to the interference signal power, that is, may determine the interference strength of the UE, and schedule different time-frequency resources for the UE according to the interference strength of the UE.

According to the foregoing embodiment, the base station can schedule different time-frequency resources for the UE based on the determined interference strength of the UE, so as to reduce the proportion of the fed-back NACKs, so that the channel access priority of the UE can be increased.

In the foregoing embodiment of the present disclosure, scheduling different time-frequency resources for the first type of device and the second type of device includes: scheduling the time-frequency resources other than the specified resource location for the first type of device. In this embodiment, it is possible to schedule the time-frequency resources other than the specified resource location for the second type of device, or to schedule the time-frequency resources at the specified resource location for the second type of device.

Specifically, an interference signal power may be reported by the UE. When the receiving the interference signal power reported by the UE, the base station can determine the interference environment in which the UE is located according to the interference signal power, that is, the base station can determine the interference strength of the UE, and schedule different time-frequency resources for the UE according to the interference strength of the UE.

The eNB is an abbreviation for evolved Node B. In the standard for LTE/LTE-A of 3GPP, eNB represents a base station, and corresponds to a UE.

Further, the eNB sorts the UEs according to the measured interference strength according to the interference strength power reported by the UEs. For the UEs having large interference strength (that is, the first type of device described above), the eNB schedules uplink and downlink transmissions corresponding to this type of UEs to the time-frequency resources other than the reference sub-frame set (that is, the specified resource location), that is, it is not necessary to perform ACK feedback on UEs having large interference strength.

Specifically, scheduling the UEs having large interference strength (i.e., the first type of device described above) to the time-frequency resources other than the reference sub-frame set (i.e., the specified resource location) includes: scheduling the UEs having the large interference to one of the following positions: a first sub-frame to a second-to-last sub-frame of a data burst signal; a second sub-frame to a last sub-frame of the data burst signal; sub-frames of a first data burst signal to a second-to-last data burst signal in continuous multiple data burst signals; and complete sub-frames or partial sub-frames after a first complete sub-frame of the data burst signal.

Taking the downlink transmission scheduling as an example, the base station schedules time-frequency resources other than the reference sub-frame set for the UEs having large measured interference strength, and schedules time-frequency resources on the reference sub-frame for the UEs having small measured interference strength (that is, the second type of device described above).

Specifically, scheduling the UEs having large interference strength (i.e., the first type of device described above) to the time-frequency resources other than the reference sub-frame set (i.e., the specified resource location) includes the following cases:

if the reference sub-frame set includes the latest downlink sub-frame that can feed back ACK/NACK, scheduling to a first sub-frame to a second-to-last sub-frame in a data burst signal (DL burst);

if the reference sub-frame set includes the first sub-frame in the latest downlink data burst signal that can feed back ACK/NACK, scheduling to a second sub-frame to a last sub-frame in the data burst signal;

if the reference sub-frame set includes all of the sub-frames in the latest downlink data burst signal that can feed back ACK/NACK, scheduling to sub-frames in a first data burst signal to a second-to-last data burst signal of continuous multiple data burst signals; and if the reference sub-frame set includes a first complete sub-frame in the latest downlink data burst signal and a partial sub-frame that may exist before the first complete sub-frame, scheduling to complete sub-frames or partial sub-frames after the first complete sub-frame in the data burst signal.

It should be noted that the base station may also schedule time-frequency resources other than the reference sub-frame set for the UEs having small measured interference strength. It is also possible to schedule only transmissions that do not require ACK feedback in the reference sub-frame set, such as broadcast, etc. The same is true for the case of uplink transmission scheduling.

According to the foregoing embodiment, the base station schedules time-frequency resources other than the reference sub-frame set for the UEs having large measured interference strength, that is, the data that is sent to the UEs that are susceptible to significant interference is scheduled to the time-frequency resources other than the reference sub-frame set. This will reduce the proportion of the fed-back NACKs in the reference sub-frame set, so as to reduce the size of the contention window, that is, increase the channel access priority of the UEs.

In the foregoing embodiment of the present disclosure, scheduling the time-frequency resources for the mobile communication network device according to the predetermined resource scheduling manner includes: scheduling different time-frequency resources at the specified resource location for the mobile communication network device.

Alternatively, scheduling different time-frequency resources at the specified resource location for the mobile communication network device includes one of the following: in the case of a constant number of transmission bits, allocating more frequency resources than the preset resources to the mobile communication network device; in the case of the same time-frequency resources, allocating less transmission bits than the preset transmission bits to the mobile communication network device; and allocating less transmission bits than the preset transmission bits to the mobile communication network device while allocating more frequency resources than the preset resources to the mobile communication network device.

Alternatively, scheduling the time-frequency resources for the mobile communication network device according to the predetermined resource scheduling manner includes: scheduling the time-frequency resources at the specified resource location for a mobile communication network device having a plurality of spatial channels, for example, scheduling the time-frequency resources at the specified resource location for a mobile communication network device having a plurality of receiving antennas.

Alternatively, scheduling different time-frequency resources at the specified resource location for the mobile communication network device includes: allocating frequency band resources having a first transmit power to a mobile communication network device having a first channel quality; allocating frequency band resources having a second transmit power to a mobile communication network device having a second channel quality; wherein the first channel quality is lower than the second channel quality, and the first transmit power is greater than the second transmit power.

Alternatively, scheduling different time-frequency resources at the specified resource location for the mobile communication network device includes: scheduling a mobile communication network device having a first interference signal strength to a first sub-bandwidth of the specified resource location, and scheduling a mobile communication network device having a second interference signal strength to a second sub-bandwidth of the specified resource location, wherein the first interference signal strength is greater than the second interference signal strength, and the interference signal strength of the first sub-bandwidth is lower than the interference signal strength of the second sub-bandwidth.

Specifically, in some cases, it is unavoidable to schedule the UEs having large measured interference strength to the reference sub-frame set. When this occurs, in order to further improve the transmission success rate of the data scheduled into the reference sub-frame set, the base station needs to adopt a different sub-frame scheduling policy for the reference sub-frame set to improve the transmission reliability. That is, the base station adopts a conservative transmission mode for the transmission in the reference sub-frame set. The conservative transmission mode includes the following four modes:

1) Transmission mode of improving the redundancy of information transmission: in the case of a constant number of transmission bits, allocating more frequency resources than the preset resources to the mobile communication network device; in the case of the same time-frequency resources, allocating less transmission bits than the preset transmission bits to the mobile communication network device; and allocating less transmission bits than the preset transmission bits to the mobile communication network device while allocating more frequency resources than the preset resources to the mobile communication network device. With these three modes, a similar effect can be achieved.

2) Transmission mode of improving the degree of transmission or reception diversity: for the transmission diversity, the transmission is performed by means of transmission diversity or by means of RANK-1 transmission mode; for the reception diversity, the UE having multiple receiving antennas may be scheduled to the reference sub-frame set.

The degree of diversity refers to receiving multiple copies of an original signal carrying the same information through multiple channels (time, frequency or space). Due to the different transmission characteristics of multiple channels, the correctness of using the multiple copies to transmit information is different. Transmission diversity refers to transmitting multiple signal copies of the same information through multiple antennas having independent fading characteristics, respectively; the multiple antennas transmit the same content, but the content order is different; as long as the terminal can solve the content of one of the diversities, the purpose is achieved. Reception diversity refers to providing multiple antennas at the receiving end, receiving signals through the multiple antennas, and then synthesizing or selecting one of the strong signals to obtain a total receiving antenna signal.

By adopting the transmission modes of the transmission diversity and the reception diversity described above, and by improving the degree of transmission diversity or reception diversity, the information transmission performance can be improved without increasing the bandwidth and the transmit power, the reliability of the content transmission is increased, the interference is reduced, and the information transmission rate is improved.

3) Transmission mode of improving the transmit power: it can reduce the transmit power of part of the bandwidths and improve the transmit power of other part of the bandwidths by means of allocating power on the frequency band while ensuring that the parameter for the transmit power of the entire bandwidth is within the allowable range of standards and regulations, so as to achieve the purpose of increasing the transmit power. For example, the transmit power on the sub-bandwidth allocated for the UE having better channel quality (including channel coefficient and interference, etc.) (i.e., the second channel quality described above) is reduced, or the transmit power is not allocated for part of sub-bandwidths of the UE having better channel quality, so as to increase the transmit power in the sub-bandwidth allocated for the UE having poor channel quality (i.e., the first channel quality described above).

4) Transmission mode of frequency selective scheduling: the UE needs to feed back the interference signal strength on each sub-bandwidth, and the base station schedules the UE to the sub-bandwidth having the lowest possible interference according to the interference situations on different sub-bandwidths, that is, schedules the UE having large interference signal strength (i.e., the above-described mobile communication network device having the first interference signal strength) to the sub-bandwidth having less interference strength (and the above-described first sub-bandwidth of the specified resource location).

Through the above four transmission modes, the reliability of information transmission in the reference sub-frame set may be improved.

In the foregoing embodiment of the present disclosure, scheduling the time-frequency resources for the mobile communication network device according to the predetermined resource scheduling manner includes: by means of increasing the aggregation level, scheduling the time-frequency resources of a physical downlink control channel (PDCCH), and improving the transmit power for transmitting a signal in the PDCCH.

When the UE does not correctly solve the Physical Downlink Control Channel ((E)PDCCH) licensed in the uplink and downlink, the UE neither feeds back ACK nor feeds back NACK, because the UE does not send any signal when it considers there is no license for itself, which is called as Discontinuous Transmission (DTX). When DTX is generated in the reference sub-frame set, since it is assumed that when the (E)PDCCH is transmitted in the unlicensed frequency band (self-scheduling), it is also subject to large interference, at this point, the base station feeds back NACK, which may increase the probability of exceeding the preset ACK/NACK proportional threshold, further increasing the risk of the contention window to grow. In order to avoid the influence of DTX, it is necessary to improve the reliability of transmitting the (E)PDCCH, especially when the (E)PDCCH is transmitted in an unlicensed frequency band. Specifically, by means of increasing the aggregation level, the time-frequency resources for transmitting the (E)PDCCH is increased, and the transmit power in the resources for transmitting the (E)PDCCH is improved, so that the UE can correctly solve the (E)PDCCH licensed in the uplink and downlink grant to reduce the occurrence of DTX.

According to the foregoing embodiment, the reliability of the downlink control information (DCI) may be enhanced.

In the foregoing embodiment of the present disclosure, while scheduling different time-frequency resources for the first type of device and the second type of device, the method further includes: increasing the time-frequency resources of a physical uplink control channel (PUCCH); and/or reducing the code rates of an acknowledgment signal (ACK)/a negative acknowledgment signal (NACK) transmitted in a physical uplink shared channel (PUSCH).

Specifically, when the ACK fed back by the UE is not correctly received by the base station (i.e., the base station determines the ACK as NACK or DTX), if the incorrectly received ACK corresponds to the reference sub-frame set, the probability of the contention window to grow is increased. For the fed-back ACK/NACK when the UE is transmitted in the unlicensed frequency band, the probability that the fed-back ACK is incorrectly determined will be large because of the interference that the UE is subjected to. Therefore, the transmission reliability may be improved by increasing the resources that are transmitted in a physical uplink control channel (PUCCH) (such as allocating multiple PUCCH orthogonal codes to the same ACK/NACK) or reducing the code rate of the ACK/NACK transmitted in a physical uplink shared channel (PUSCH).

According to the foregoing embodiment, the probability that the ACK fed back by the UE is incorrectly determined may be reduced, thereby increasing the reliability of the ACK fed back by the UE, so as to improve the transmission success rate of the reference sub-frame set.

In the foregoing embodiment of the present disclosure, scheduling the time-frequency resources for the mobile communication network device according to the predetermined resource scheduling manner includes: determining the interference range of an interference signal affecting the mobile communication network device; and scheduling the time-frequency resources of the same data burst signal for the mobile communication network device within the same interference range of the interference signal.

Specifically, for multiple UEs that are used in the same data burst, the base station may schedule, according to the interference level reported by each of the UEs and other information (such as the geographical location information of the UEs), the UEs having similar interference level, that is, the UEs having similar measured interference strength (i.e., the above-mentioned UEs which belong to the same interference range), to the same data burst to ensure the consistency of the interference situations, this ensures that, when interfered by the same interference source, most of the UEs which are sent and received in the data burst feed back NACK, thereby increasing the size of the contention window to avoid interference collisions; and when not interfered, most of the UEs which are sent and received in the data burst feed back ACK, so that the size of the contention window is maintained in a small state, ensuring the channel access priority.

According to the foregoing embodiment, multiple terminals having the same interference range may be scheduled to the same data burst to ensure the consistency of interference situations of multiple terminals, so that multiple terminals simultaneously feed back ACK or NACK, thereby controlling the size of the contention window, so as to determine the channel access priority.

Figure 5:
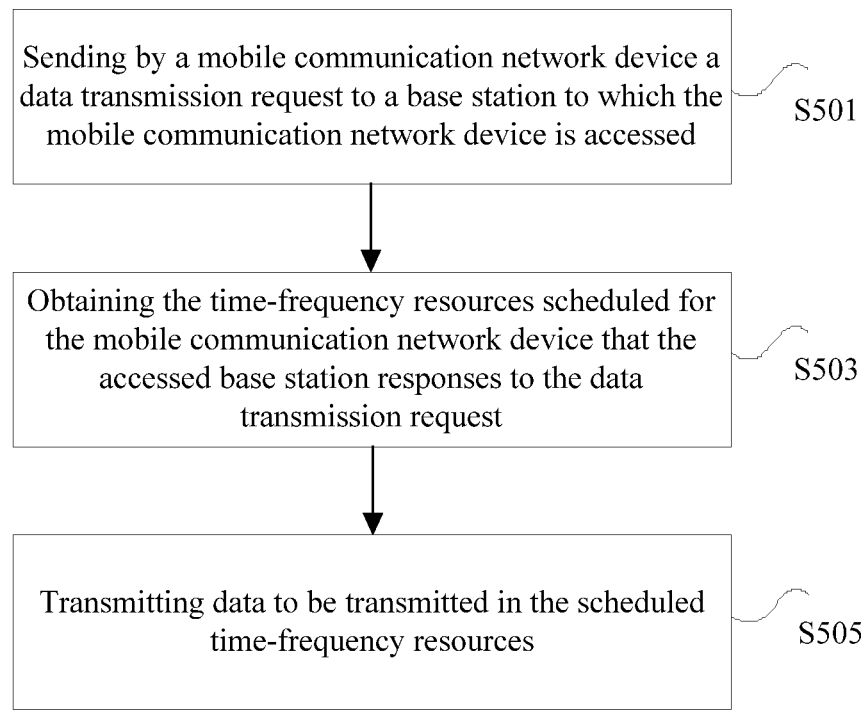
FIG. 5 is a flowchart of another method for scheduling resources in an unlicensed frequency band according to an embodiment of the present disclosure.

FIG. 5 is a flowchart of another method for scheduling resources in an unlicensed frequency band according to an embodiment of the present disclosure. As shown in FIG. 5, the method includes step S501, step S503, and step S505.

At step S501, a mobile communication network device sends a data transmission request to a base station to which the mobile communication network device is accessed.

At step S503, time-frequency resources scheduled by the accessed base station for the mobile communication network device in response to the data transmission request are obtained.

At step S505, data to be transmitted is transmitted in the scheduled time-frequency resources.

In the embodiment of the present disclosure, when receiving the data transmission request from the mobile communication network device that needs to be responded to, the base station schedules the time-frequency resources for the mobile communication network device according to the predetermined resource scheduling manner that can improve the transmission success rate at the specified resource location, and transmits data to be transmitted in the scheduled time-frequency resources. According to foregoing embodiment, transmitting data to be transmitted in the scheduled time-frequency resources can reduce the proportion of the NACKs fed back in the reference sub-frame set, and improve the transmission success rate of the channel priority reference sub-frame set (i.e., at the specified resource location described above). Since the channel access priority is adjusted proportionally based on the transmission success rate at the specified resource location, increasing the transmission success rate at the specified resource location can increase the channel access priority. According to the foregoing embodiment of the present disclosure, the existing technical problem of lowering the overall channel access priority of the entire cell due to part of terminals which are affected by significant interference is solved.

The above mobile communication network device may be a mobile communication network terminal, and the terminal refers to a terminal product that can support the communication protocol of land mobile communication system, such as a mobile phone, a tablet computer; or may be a modem module for a special communication (Wireless Modem), the modem module may be integrated in various types of terminals such as a mobile phone, a tablet computer, and a data card to complete the communication function.

Specifically, when the base station receives the data transmission request from the mobile communication network device that needs to be responded to, on the one hand, the base station can schedule different time-frequency resources for different terminals according to the interference strengths reported by the terminals, for example, can schedule the time-frequency resources other than the reference sub-frame set for the terminals having large measured interference strengths; can report conservative channel state information for the terminals having large measured interference strengths, so as to improve the reliability of data transmission; and can schedule the terminals having similar measured interference strengths into the same data burst signal, so as to ensure the consistency of interference situations to ensure the reliability of the channel access priority; on the other hand, the transmission redundancy on the reference sub-frame set may be improved to improve the transmission reliability of the channel priority reference sub-frame set, for example, the base station adopts a conservative transmission mode for data transmission in the reference sub-frame set.

In the foregoing embodiment of the present disclosure, the method further includes, prior to sending by the mobile communication network device the data transmission request to the base station to which the mobile communication network device is accessed: measuring a zero power channel state information-reference signal (ZP CSI-RS) according to a downlink signal from the accessed base station, and determining the interference signal strength of the mobile communication network device based on the ZP CSI-RS; and/or when a non-accessed base station occupies the channel, measuring the received signal power of the channel, and determining the interference signal strength of the mobile communication network device based on the received signal power; wherein the non-accessed base station is a base station that is not currently occupied by the mobile communication network device.

Specifically, before the terminal UE sends a data transmission request to the base station eNB to which the terminal UE is accessed, the terminal UE measures the interference signal strength and reports it to the accessed base station eNB. On one hand, the terminal UE measures zero power channel state information-reference signal (ZP CSI-RS) through the downlink signal of the accessed eNB, and determines the interference signal strength of the terminal UE based on the reference signal ZP CSI-RS; and on the other hand, when the non-accessed base station eNB occupies the channel, the UE will report a received signal strength indicator (RSSI) corresponding to the interference signal to the accessed base station eNB by measuring the received signal power, so as to determine the interference signal strength of the terminal, wherein the received signal power may be represented by the received signal strength indicator (RSSI).

The above ZP CSI-RS may also be referred to as CSI-INM (abbreviation for Channel State Information-Interference Measurement).

According to the foregoing embodiment, the interference signal strength of the terminal UE may be determined, and different time-frequency resources are scheduled for different terminals, so that data may be transmitted in different time-frequency resources to improve the reliability of data transmission.

In the foregoing embodiment of the present disclosure, the method further includes, prior to sending by the mobile communication network device the data transmission request to the base station to which the mobile communication network device is accessed: correcting the currently determined interference signal strength according to an indication from the accessed base station and/or the previously measured interference signal strength of the mobile communication network device.

Specifically, when the terminal UE measures and feeds back channel state information (CSI) according to the measured interference signal, the currently measured channel quality needs to be corrected according to the measured interference signal of the terminal UE and the previously measured channel quality. For example, in the case that the previously measured interference signal strength of the terminal UE is large, the currently measured CSI needs to be down-regulated (MCS is down-regulated, and RANK is down-regulated), so as to obtain the improvement of the reliability using a conservative scheduling manner; when the UE continuously measures multiple CSIs with good channel quality, it may report them according to the normally measured CSI.

The terminal UE described above reports the CSI according to the measured interference strength, or may report the CSI according to the indication from the base station, that is, the base station instructs the UE to perform CSI feedback adjustment according to the interference situation reported by the UE.

Figure 6:
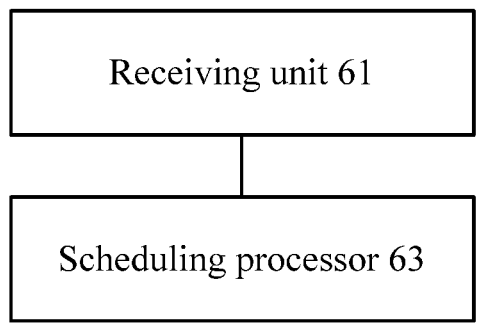
FIG. 6 is a schematic structural diagram of a base station according to an embodiment of the present disclosure.

FIG. 6 is a schematic structural diagram of a base station according to an embodiment of the present disclosure. As shown in FIG. 6, the base station may include: a receiving unit 61 and a scheduling processor 63.

The receiving unit 61 is configured to receive a data transmission request from a mobile communication network device.

The scheduling processor 63 is configured to: when the transmission indicated by the data transmission request is a transmission that needs to be responded to, schedule time-frequency resources for the mobile communication network device according to a predetermined resource scheduling manner, so as to improve the transmission success rate at a specified resource location in the time-frequency resources.

In the embodiment of the present disclosure, when receiving the data transmission request from the mobile communication network device that needs to be responded to, the base station schedules the time-frequency resources for the mobile communication network device according to the predetermined resource scheduling manner that can improve the transmission success rate at the specified resource location. That is, the proportion of the NACKs fed back in the reference sub-frame set is reduced, and the transmission success rate of the channel priority reference sub-frame set (i.e., at the specified resource location described above) is improved. Since the channel access priority is adjusted proportionally based on the transmission success rate at the specified resource location, improving the transmission success rate at the specified resource location can increase the channel access priority. According to the foregoing embodiment of the present disclosure, the existing technical problem of lowering the overall channel access priority of the entire cell due to part of terminals which are affected by significant interference is solved.

The channel access priority refers to the priority of the mobile communication network device to transmit data in the channel of the obtained time-frequency resources when the time-frequency resources are limited.

The above mobile communication network device may be a mobile communication network terminal, and the terminal refers to a terminal product that can support the communication protocol of land mobile communication system, such as a mobile phone, a tablet computer; or may be a modem module for a special communication (Wireless Modem), the modem module may be integrated in various types of terminals such as a mobile phone, a tablet computer, and a data card to complete the communication function.

Specifically, when the base station receives the data transmission request from the mobile communication network device that needs to be responded to, on the one hand, the base station can schedule different time-frequency resources for different terminals according to the interference strengths reported by the terminals, for example, can schedule the time-frequency resources other than the reference sub-frame set for the terminals having large measured interference strengths; can report conservative channel state information for the terminals having large measured interference strengths, so as to improve the reliability of data transmission; and can schedule the terminals having similar measured interference strengths into the same data burst signal, so as to ensure the consistency of interference situations to ensure the reliability of the channel access priority; on the other hand, the transmission redundancy on the reference sub-frame set may be improved to improve the transmission reliability of the channel priority reference sub-frame set, for example, the base station adopts a conservative transmission mode for data transmission in the reference sub-frame set.

In the foregoing embodiment, the mobile communication network device improves the transmission success rate at the specified resource location (such as the location of the reference sub-frame set) by means of wireless resource management. The channel access priority is adjusted proportionally based on the transmission success rate at the specified resource location. That is, the channel access priority is increased by improving the transmission success rate of the reference sub-frame set. The higher the transmission success rate is, the smaller the contention window is, and the higher the channel access priority is.

According to the foregoing embodiment, while the existing problem of lowering the overall channel access priority of the entire cell due to part of terminals which are affected by significant interference is solved, the terminals should follow the principle to fairly compete the channels.

In the foregoing embodiment of the present disclosure, the scheduling processor is configured to: determine, according to the interference signal strength carried in the data transmission request, whether the mobile communication network device belongs to a first type of device or a second type of device, and schedule different time-frequency resources for the first type of device and the second type of device, wherein the interference signal strength of the first type of device is greater than the interference signal strength of the second type of device.

Specifically, an interference signal power (such as RSSI, that is, the received signal strength indication) may be reported by the UE (i.e., the mobile communication network device). When receiving the interference signal power reported by the UE, the base station may determine the interference environment in which the UE is located according to the interference signal power, that is, may determine the interference strength of the UE, and schedule different time-frequency resources for the UE according to the interference strength of the UE.

According to the foregoing embodiment, the base station can schedule different time-frequency resources for the UE based on the determined interference strength of the UE, so as to reduce the proportion of the fed-back NACKs, so that the channel access priority of the UE can be increased.

Figure 7:
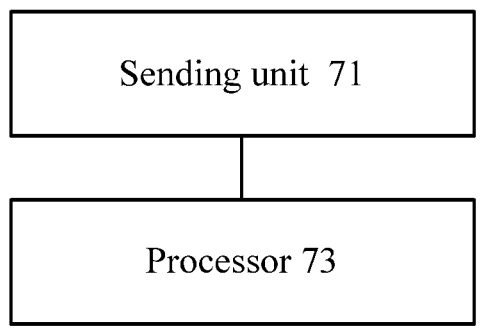
FIG. 7 is a schematic structural diagram of a terminal according to an embodiment of the present disclosure.

FIG. 7 is a schematic structural diagram of a terminal according to an embodiment of the present disclosure. As shown in FIG. 7, the terminal may include: a sending unit 71 and a processor 73.

The sending unit 71 is configured to send by a mobile communication network device a data transmission request to a base station to which the mobile communication network device is accessed, and to obtain time-frequency resources scheduled by the accessed base station for the mobile communication network device in response to the data transmission request.

The processor 73 is configured to control data to be transmitted to be transmitted in the scheduled time-frequency resources.

In the embodiment of the present disclosure, when receiving the data transmission request from the mobile communication network device that needs to be responded to, the base station schedules the time-frequency resources for the mobile communication network device according to the predetermined resource scheduling manner that can improve the transmission success rate at the specified resource location, and transmits data to be transmitted in the scheduled time-frequency resources. According to the foregoing embodiment, transmitting data to be transmitted in the scheduled time-frequency resources can reduce the proportion of the NACKs fed back in the reference sub-frame set, and improve the transmission success rate of the channel priority reference sub-frame set (i.e., at the specified resource location described above). Since the channel access priority is adjusted proportionally based on the transmission success rate at the specified resource location, increasing the transmission success rate at the specified resource location can increase the channel access priority. According to the foregoing embodiment of the present disclosure, the existing technical problem of lowering the overall channel access priority of the entire cell due to part of terminals which are affected by significant interference is solved.

The above mobile communication network device may be a mobile communication network terminal, and the terminal refers to a terminal product that can support the communication protocol of land mobile communication system, such as a mobile phone, a tablet computer; or may be a modem module for a special communication (Wireless Modem), the modem module may be integrated in various types of terminals such as a mobile phone, a tablet computer, and a data card to complete the communication function.

Specifically, when the base station receives the data transmission request from the mobile communication network device that needs to be responded to, on the one hand, the base station can schedule different time-frequency resources for different terminals according to the interference strengths reported by the terminals, for example, can schedule the time-frequency resources other than the reference sub-frame set for the terminals having large measured interference strengths; can report conservative channel state information for the terminals having large measured interference strengths, so as to improve the reliability of data transmission; and can schedule the terminals having similar measured interference strengths into the same data burst signal, so as to ensure the consistency of interference situations to ensure the reliability of the channel access priority; on the other hand, the transmission redundancy on the reference sub-frame set may be improved to improve the transmission reliability of the channel priority reference sub-frame set, for example, the base station adopts a conservative transmission mode for data transmission in the reference sub-frame set.

In the foregoing embodiment, the mobile communication network device improves the transmission success rate at the specified resource location (such as the location of the reference sub-frame set) by means of wireless resource management. The channel access priority is adjusted proportionally based on the transmission success rate at the specified resource location. That is, the channel access priority is increased by improving the transmission success rate of the reference sub-frame set. The higher the transmission success rate is, the smaller the contention window is, and the higher the channel access priority is.

According to the foregoing embodiment, while the existing problem of lowering the overall channel access priority of the entire cell due to part of terminals which are affected by significant interference is solved, and the terminals should follow the principle to fairly compete the channels.

According to an embodiment of the present disclosure, there is further provided a non-transitory computer readable storage medium, which stores computer instructions for causing a computer to perform the method according to the method embodiment related to step 202 to step 204.

According to an embodiment of the present disclosure, there is further provided a non-transitory computer readable storage medium, which stores computer instructions for causing a computer to perform the method according to the method embodiment related to step 501 to step 505.

According to an embodiment of the present disclosure, there is further provided a computer program product, including a computer program stored on a non-transitory computer readable storage medium. The computer program includes program instructions. When the program instructions are executed by a computer, the computer is caused to perform the method according to the method embodiment related to step 202 to step 204.

According to an embodiment of the present disclosure, there is further provided another computer program product, including a computer program stored on a non-transitory computer readable storage medium. The computer program includes program instructions. When the program instructions are executed by a computer, the computer is caused to perform the method according to the method embodiment related to step 501 to step 505.

Figure 8:
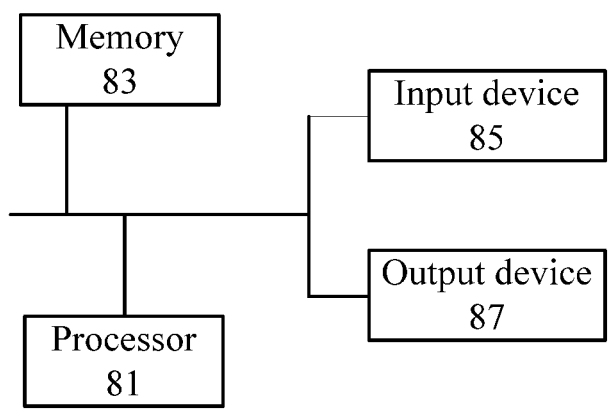
FIG. 8 is a schematic diagram of a hardware structure of an electronic device performing a method for scheduling resources in an unlicensed frequency band according to an embodiment of the present disclosure.

FIG. 8 is a schematic diagram of a hardware structure of an electronic device for performing the method for scheduling resources in an unlicensed frequency band according to the method embodiment related to step 202 to step 204. As shown in FIG. 8, the electronic device includes: one or more processors 81, and a memory 83.

A case that the electronic device includes one processor 81 is taken for example in FIG. 8.

The electronic device may further include an input device 85 and an output device 87.

The processor 81, the memory 83, the input device 85, and the output device 87 may be connected by a bus or other means, and a case that they are connected by a bus is taken for example in FIG. 8.

The memory 83, as a non-transitory computer readable storage medium, may be configured to store non-transitory software programs, non-transitory computer-executable programs, and modules, for example, the program instructions/modules (for example, the receiving unit 61 shown in FIG. 6) corresponding to the method for scheduling resources in an unlicensed frequency band according to step 202 to step 204 and related steps of the embodiment of the present disclosure. The processor 81 performs various functional applications and data processing of the server by running the non-transitory software programs, instructions, and modules stored in the memory 83, that is, implements the method for scheduling resources in an unlicensed frequency band according to the method embodiment related to step 202 to step 204.

The memory 83 may include a program memory area and a data memory area. The program memory area may store an operating system, an application program required by at least one function. The data memory area may store data that are built in accordance with application of the base station, etc. Furthermore, the memory 83 may include a high-speed random access memory, and may also include a non-transitory memory, such as at least one magnetic disk memory, a flash memory, or other non-transitory solid-state memory s. In some embodiments, the memory 83 may alternatively include memories which are remotely provided relative to the processor 81, and these remote memories may be connected to the base station over a network. The examples of the network include, but are not limited to, internet, intranet, local area networks, mobile communication network, and combinations thereof.

The input device 85 may receive input numeral or character information, and generate key signal inputs related to user settings and function control of the base station. The output device 87 may include a display device such as a display screen.

The one or more modules are stored in the memory 83, and when executed by the one or more processors 81, the method for scheduling resources in an unlicensed frequency band according to the method embodiment related to step 202 to step 204 is performed.

The above electronic device can perform the method according to the embodiment of the present disclosure, and have the corresponding functional modules and beneficial effects for performing the method. For the technical details that are not described in detail in this embodiment, reference may be made to the method according to the embodiment of the present disclosure.

Figure 9:
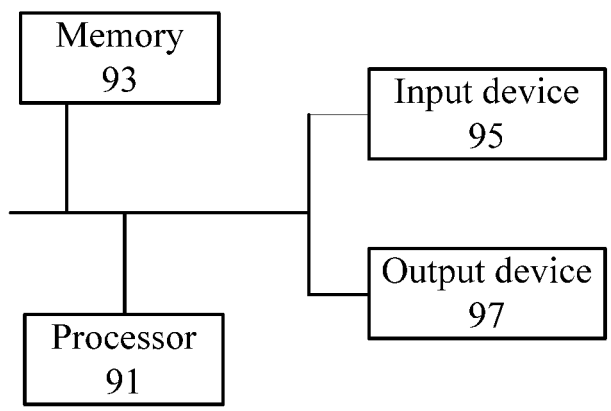
FIG. 9 is a schematic diagram of a hardware structure of another electronic device performing a method for scheduling resources in an unlicensed frequency band according to an embodiment of the present disclosure.

FIG. 9 is a schematic diagram of a hardware structure of an electronic device for performing the method for scheduling resources in an unlicensed frequency band according to the method embodiment related to step 501 to step 505. As shown in FIG. 9, the electronic device includes: one or more processors 91, and a memory 93.

A case that the electronic device includes one processor 91 is taken for example in FIG. 9.

The electronic device may further include an input device 95 and an output device 97.

The processor 91, the memory 93, the input device 95, and the output device 97 may be connected by a bus or other means, and a case that they are connected by a bus is taken for example in FIG. 9.

The memory 93, as a non-transitory computer readable storage medium, may be configured to store non-transitory software programs, non-transitory computer-executable programs, and modules, for example, the program instructions/modules (for example, the sending unit 71 shown in FIG. 7) corresponding to the method for scheduling resources in an unlicensed frequency band according to step 501 to step 505 and related steps of the embodiment of the present disclosure. The processor 91 performs various functional applications and data processing of the server by running the non-transitory software programs, instructions, and modules stored in the memory 93, that is, implements the method for scheduling resources in an unlicensed frequency band according to the method embodiment related to step 501 to step 505.

The memory 93 may include a program memory area and a data memory area.

The program memory area may store an operating system, an application program required by at least one function. The data memory area may store data that are built in accordance with application of the terminal, etc. Furthermore, the memory 93 may include a high-speed random access memory, and may also include a non-transitory memory, such as at least one magnetic disk memory, a flash memory, or other non-transitory solid-state memory devices. In some embodiments, the memory 93 may alternatively include memories which are remotely provided relative to the processor 91, and these remote memories may be connected to the terminal over a network. The examples of the network include, but are not limited to, internet, intranet, local area networks, mobile communication network, and combinations thereof.

The input device 95 may receive input numeral or character information, and generate key signal inputs related to user settings and function control of the terminal. The output device 97 may include a display device such as a display screen.

The one or more modules are stored in the memory 93, and when executed by the one or more processors 91, the method for scheduling resources in an unlicensed frequency band according to the method embodiment related to step 501 to step 505 is performed.

The above electronic device can perform the method according to the embodiment of the present disclosure, and have the corresponding functional modules and beneficial effects for performing the method. For the technical details that are not described in detail in this embodiment, reference may be made to the method according to the embodiment of the present disclosure.

The electronic device according to the embodiment of the present disclosure exist in various formats, including but not limited to the followings:

(1) mobile communication equipment: having the feature of a mobile communication function and the main objective of providing voice and data communication, and including a smart phone (e.g., iPhone), a multimedia mobile phone, a functional mobile phone, a low-end mobile phone, etc.;

(2) ultra-mobile personal computer equipment: belonging to personal computers, having computing and processing functions, generally having a mobile Internet access feature and including PDA, MID, UMPC, etc., for example, iPad;

(3) portable recreation equipment: being capable of displaying and broadcasting multimedia contents and including audio and video players (e.g., iPod), a hand-held game player, an e-book, intelligent toys and portable vehicle-mounted navigation equipment;

(4) server: providing computing service and including a processor, a hard disk, an internal storage, a system bus, etc., having a similar architecture to a universal computer and demanding more on the processing capability, the stability, the reliability, the security, the expandability, the manageability, etc. due to the need for providing high-reliability services;

(5) other electronic devices with data interaction functions;

The serial numbers of the embodiments of the present disclosure are merely for description, and do not represent the advantages and disadvantages of the embodiments.

In the above-mentioned embodiments of the present disclosure, the descriptions of the embodiments have their respective emphases. For the parts that are not detailed in a certain embodiment, refer to the related descriptions of other embodiments.

It should be understood that in the embodiments provided by the present disclosure, the disclosed technical contents may be realized by other means. The device embodiments described above are merely schematic. For example, the partitioning of the units may be a logical functional partitioning. There may be other partitioning modes during actual implementation. For example, multiple units or components may be combined or integrated into another system, or some features may be ignored or not executed. In addition, mutual coupling or direct coupling or communication connection that is shown or discussed may be indirect coupling or communication connection through some interfaces, units or modules, and may be in electrical or other formats.

The units described as separate components may or may not be physically separated, and the components for unit display may or may not be physical units, that is, may be located in one place or distributed on a plurality of units. Part or all of the units may be selected according to actual needs to achieve the objective of the solutions of the embodiments.

In addition, all functional units in the embodiments of the present disclosure may be integrated into one processing unit. Or, each unit exists physically independently. Or, two or more units may be integrated into one unit. The above integrated units may be realized in the form of hardware or a software functional unit.

The integrated units, if realized in the form of the software functional unit and sold or used as a standalone product, may be stored in a computer readable storage medium. Based on such understanding, the technical solution of the present disclosure in essence, or a part that contributes to the prior art, or all or part of the technical solution, may be embodied in the form of a software product. The computer software product is stored in a storage medium and includes a plurality of instructions for a computer device (which may be a personal computer, a server, a network device or the like) to perform all or part of the steps of the method described in the embodiments of the present disclosure. The foregoing storage medium includes: a USB flash disk, a Read-Only Memory (ROM), a Random Access Memory (RAM), a removable hard disk, a magnetic disk, an optical disk, or other various media that may store program codes.

The above description is merely a preferred implementation of the present disclosure, and it should be noted that those skilled in the art can also make several improvements and modifications without departing from the principle of the present disclosure. These improvements and modifications should be considered as the scope of protection of this present disclosure.

What is claimed is:

1. A method for scheduling resources in an unlicensed frequency band, comprising:
   receiving a data transmission request from a mobile communication network device; and
   when a transmission indicated by the data transmission request is a transmission that needs to be responded to, scheduling time-frequency resources for the mobile communication network device in accordance with a predetermined resource scheduling manner, so as to improve a transmission success rate at a specified resource location in the time-frequency resources,
   wherein the data transmission request carries an interference signal strength, and said scheduling the time-frequency resources for the mobile communication network device in accordance with the predetermined resource scheduling manner comprises:
   determining, in accordance with the interference signal strength, whether the mobile communication network device belongs to a first type of device or a second type of device, wherein an interference signal strength of the first type of device is greater than an interference signal strength of the second type of device; and
   scheduling different time-frequency resources for the first type of device and the second type of device.

2. The method according to claim 1, wherein said scheduling different time-frequency resources for the first type of device and the second type of device comprises:
   scheduling time-frequency resources other than the time-frequency resources at the specified resource location for the first type of device.

3. The method according to claim 2, wherein the time-frequency resources other than the time-frequency resources at the specified resource location comprises one of:
   a first sub-frame to a second-to-last sub-frame in a data burst signal;

a second sub-frame to a last sub-frame in a data burst signal;

sub-frames in a first data burst signal to a second-to-last data burst signal of continuous multiple data burst signals; or complete sub-frames or partial sub-frames after a first complete sub-frame in the data burst signal.

4. The method according to claim 1, wherein said scheduling the time-frequency resources for the mobile communication network device in accordance with the predetermined resource scheduling manner comprises:

scheduling different time-frequency resources at the specified resource location for the mobile communication network device.

5. The method according to claim 4, wherein said scheduling different time-frequency resources at the specified resource location for the mobile communication network device comprises one of:

in a case of a constant number of transmission bits, allocating more frequency resources than preset resources to the mobile communication network device;

in a case of same time-frequency resources, allocating less transmission bits than preset transmission bits to the mobile communication network device; or allocating less transmission bits than the preset transmission bits to the mobile communication network device while allocating more frequency resources than the preset resources to the mobile communication network device.

6. The method according to claim 4, wherein said scheduling different time-frequency resources at the specified resource location for the mobile communication network device comprises:

allocating frequency band resources having a first transmit power to the mobile communication network device when the mobile communication network device has a first channel quality; and allocating frequency band resources having a second transmit power to the mobile communication network device when the mobile communication network device has a second channel quality, wherein the first channel quality is lower than the second channel quality, and the first transmit power is greater than the second transmit power.

7. The method according to claim 4, wherein said scheduling different time-frequency resources at the specified resource location for the mobile communication network device comprises:

scheduling the mobile communication network device to a first sub-bandwidth of the specified resource location when the mobile communication network device has a first interference signal strength, and scheduling the mobile communication network device to a second sub-bandwidth of the specified resource location when the mobile communication network device has a second interference signal strength, wherein the first interference signal strength is greater than the second interference signal strength, and an interference signal strength of the first sub-bandwidth is lower than an interference signal strength of the second sub-bandwidth.

8. The method according to claim 1, wherein said scheduling the time-frequency resources for the mobile communication network device in accordance with the predetermined resource scheduling manner comprises:

scheduling time-frequency resources at the specified resource location for the mobile communication network device having a plurality of spatial channels.

9. The method according to claim 1, wherein said scheduling the time-frequency resources for the mobile communication network device in accordance with the predetermined resource scheduling manner comprises:

by means of increasing an aggregation level, scheduling time-frequency resources of a physical downlink control channel (PDCCH), and improving transmit power for transmitting a signal in the PDCCH.

10. The method according to claim 1, wherein, while scheduling different time-frequency resources for the first type of device and the second type of device, the method further comprises:

increasing time-frequency resources of a physical uplink control channel (PUCCH); and/or reducing code rates of an acknowledgment signal (ACK)/a negative acknowledgment signal (NACK) transmitted in a physical uplink shared channel (PUSCH).

11. The method according to claim 1, wherein said scheduling the time-frequency resources for the mobile communication network device in accordance with the predetermined resource scheduling manner comprises:

determining an interference range of an interference signal affecting the mobile communication network device; and scheduling time-frequency resources of a same data burst signal for mobile communication network devices within an interference range of a same interference signal.

12. An electronic device, comprising: at least one processor; and a storage communicatively connected to the at least one processor, wherein the storage stores instructions executable by the at least one processor, and the instructions are configured to perform the method according to claim 1.

13. A base station, comprising:

a receiving unit configured to receive a data transmission request from a mobile communication network device; and a scheduling processor configured to: when a transmission indicated by the data transmission request is a transmission that needs to be responded to, schedule time-frequency resources for the mobile communication network device in accordance with a predetermined resource scheduling manner, so as to improve a transmission success rate at a specified resource location in the time-frequency resources, wherein the scheduling processor is configured to:

determine, in accordance with an interference signal strength carried in the data transmission request, whether the mobile communication network device belongs to a first type of device or a second type of device, and schedule different time-frequency resources for the first type of device and the second type of device, wherein an interference signal strength of the first type of device is greater than an interference signal strength of the second type of device.

* * * * *